(12) United States Patent  
Clément et al.

(10) Patent No.: US 11,861,458 B2  
(45) Date of Patent: Jan. 2, 2024

(54) SYSTEMS AND METHODS FOR DETECTING AND RECORDING ANOMALOUS VEHICLE EVENTS

(71) Applicant: Lyft, Inc., San Francisco, CA (US)

(72) Inventors: Romain Clément, Campbell, CA (US); Helen Ruth Lurie, San Francisco, CA (US); Sammy Omari, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 981 days.

(21) Appl. No.: 16/107,986

(22) Filed: Aug. 21, 2018

(65) Prior Publication Data

US 2020/0065711 A1 Feb. 27, 2020

(51) Int. Cl.
  *B60W 30/09* (2012.01)
  *G06N 20/00* (2019.01)
  *G07C 5/08* (2006.01)
  *B60W 40/02* (2006.01)
  *B60W 40/08* (2012.01)
  (Continued)

(52) U.S. Cl.
  CPC ......... *G06N 20/00* (2019.01); *B60W 30/0956* (2013.01); *B60W 40/02* (2013.01); *B60W 40/08* (2013.01); *B60W 40/10* (2013.01); *G07C 5/085* (2013.01)

(58) Field of Classification Search
  CPC ...... G06N 20/00; B60W 40/02; B60W 40/08; B60W 40/10; G07C 5/085
  See application file for complete search history.

(56) References Cited

U.S. PATENT DOCUMENTS 9,298,575 B2 * 3/2016 Tamari ................ G06F 11/3058  
9,349,229 B2 * 5/2016 Hashimoto ............ G07C 5/085  
(Continued)

FOREIGN PATENT DOCUMENTS

CA 3018604 A1 * 10/2017 ............. G06T 15/08  
CA 3052234 A1 * 8/2018 ............... G06N 7/08  
(Continued)

OTHER PUBLICATIONS

International Search Report and Written Opinion for International Application PCT/US2019/045204, dated Nov. 26, 2019.

(Continued)

*Primary Examiner* — Shelley Chen  
(74) *Attorney, Agent, or Firm* — Baker Botts L.L.P.

(57) ABSTRACT

In one embodiment, a computing system accesses contextual data associated with a vehicle operated by a human driver. The contextual data is captured using one or more sensors associated with the vehicle. The system determines one or more predicted vehicle operations by processing the contextual data based at least on information associated with pre-recorded contextual data associated with a number of vehicles. The system detects one or more vehicle operations made by the human driver. The system determines that an event of interest is associated with the contextual data based on a comparison of the one or more vehicle operations made by the human driver and the one or more predicted vehicle operations. The system causes high-resolution contextual data associated with the event of interest to be stored.

20 Claims, 10 Drawing Sheets

(51) Int. Cl.
  *B60W 40/10*   (2012.01)
  *B60W 30/095*  (2012.01)

(56) References Cited

U.S. PATENT DOCUMENTS

| | | | |
|---|---|---|---|
| 9,805,601 B1* | 10/2017 | Fields | G08G 1/0129 |
| 10,606,270 B2* | 3/2020 | Englard | G05D 1/0274 |
| 11,120,353 B2* | 9/2021 | Olabiyi | B60W 50/0097 |
| 11,282,385 B2* | 3/2022 | Lewis | G06V 20/56 |
| 2007/0132773 A1* | 6/2007 | Plante | G07C 5/0891 |
| | | | 345/564 |
| 2011/0052068 A1* | 3/2011 | Cobb | G06K 9/6251 |
| | | | 382/190 |
| 2013/0096731 A1 | 4/2013 | Tamari | |
| 2014/0257594 A1 | 9/2014 | Hashimoto | |
| 2015/0178937 A1 | 6/2015 | Gupta | |
| 2016/0031450 A1 | 2/2016 | Wilson | |
| 2016/0292696 A1* | 10/2016 | Gong | G08G 5/0008 |
| 2017/0228948 A1* | 8/2017 | Albitz | G07C 5/0841 |
| 2018/0046910 A1 | 2/2018 | Greene | |
| 2018/0050800 A1* | 2/2018 | Boykin | G06T 7/70 |
| 2018/0053108 A1* | 2/2018 | Olabiyi | G01C 21/3848 |
| 2018/0144621 A1 | 5/2018 | Arai | |
| 2019/0187720 A1* | 6/2019 | Fowe | G01C 21/3676 |
| 2019/0188930 A1* | 6/2019 | Tsukahara | G07C 5/008 |
| 2019/0384304 A1* | 12/2019 | Towal | G06N 3/08 |
| 2020/0019165 A1* | 1/2020 | Levandowski | G08G 1/096791 |
| 2020/0234582 A1* | 7/2020 | Mintz | G08G 1/096811 |

FOREIGN PATENT DOCUMENTS

| | | | | |
|---|---|---|---|---|
| CN | 103854267 A | 6/2014 | | |
| CN | 105072986 A | 11/2015 | | |
| CN | 105966405 A | 9/2016 | | |
| CN | 107735838 A | 2/2018 | | |
| CN | 108205830 A | 6/2018 | | |
| EP | 3219564 A1 | 9/2017 | | |
| GB | 201706922 | 6/2017 | | |
| JP | 2010182287 A | * | 8/2010 | |
| JP | 2018028906 A | * | 2/2018 | B60W 40/09 |
| JP | 2018028906 A | | 2/2018 | |
| JP | 2018041122 A | * | 3/2018 | B60W 40/105 |
| JP | 2018041122 A | | 3/2018 | |

OTHER PUBLICATIONS

Search Report received from IPOS for SG Patent Application No. 11202101582P, 8 pages, dated Oct. 3, 2022.
Extended European Search Report received from the EPO or European Patent Application No. 19852756.6-1009, 9 pages, dated Mar. 4, 2022.
CN OA received for Chinese Application No. 201980069292.5, 20 pages.

* cited by examiner

SYSTEMS AND METHODS FOR DETECTING AND RECORDING ANOMALOUS VEHICLE EVENTS

BACKGROUND

A modern vehicle may include one or more sensors or sensing systems for monitoring the vehicle and environment. For example, the vehicle may use speed sensors to measure the vehicle speed and may use a GPS to track the location of the vehicle. One or more cameras or LiDAR may be used to detect the surrounding objects of the vehicle. The vehicle may use one or more computing systems (e.g., an on-board computer) to collect data from the sensors. The computing systems may store the collected data in on-board storage space or upload the data to a cloud using a wireless connection.

However, the sensors of the vehicle may generate large amount of data and the computing system of the vehicle may have limited on-board storage space to store all the data and limited connection bandwidth to upload the data in real-time.

DESCRIPTION OF EXAMPLE EMBODIMENTS

Figure 1:
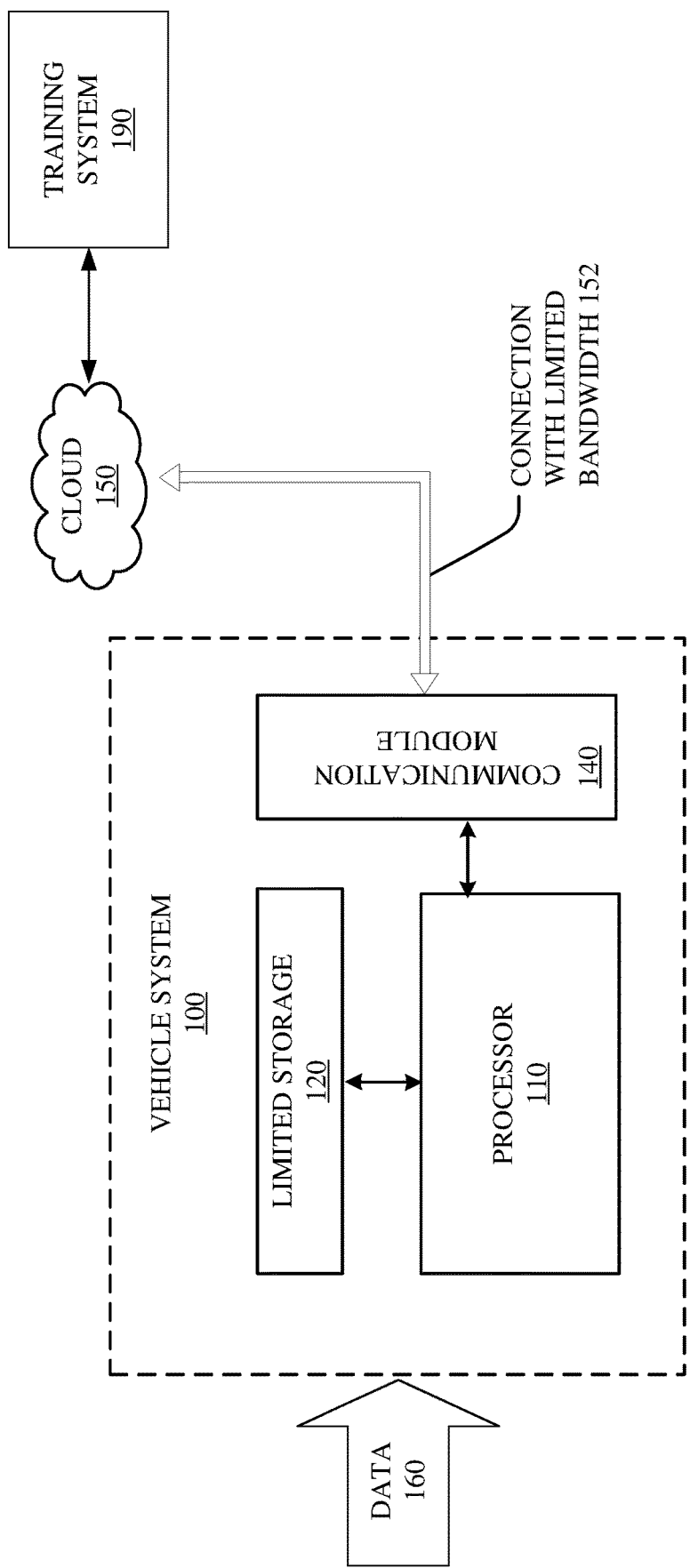
FIG. 1 illustrates an example vehicle system with limited storage space and wireless connection bandwidth.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A vehicle system may collect vast amount of data from any number of sensors (e.g., speed sensors, steering angle sensors, braking pressure sensors, a GPS, cameras, LiDAR, radars, etc.) associated with the vehicle. The collected data may be used in many applications, such as training a machine-learning (ML) model for driving autonomous vehicles or assisting human driving. The vehicle system may store the collected data in an on-board storage or upload the data to a cloud through a wireless connection. However, since the vehicle system has limited on-board storage space and wireless connection bandwidth, storing or uploading all the collected data is infeasible. While the vehicle system may pre-process the collected data and only store or upload the processed, representative results (e.g., an object list from object detection results rather than the raw image data from which the object list is generated), such approach would result in a suboptimal amount of data being collected for scenarios where richer data is needed. For example, anomalous events, such as responses to unusual conditions (e.g., anomalous trajectories or aggressive movements of other vehicles) or accidents, may constitute important edge cases that a machine-learning model of the vehicle system would need to learn to handle. A suboptimal amount of data about the edge cases may lack enough details to effectively train the machine-learning model to be sufficiently robust to handle such edge cases.

To solve the problems caused by the limited storage space and wireless connection bandwidth, particular embodiments of the vehicle system may pre-process the collected data (e.g., object identification, compression, etc.) and store/upload the pre-processed result (e.g., an identified object list, compressed data, etc.) which has a smaller size than the data before pre-processing and needs less storage space and transmission bandwidth. To capture a richer set of edge-case data, particular embodiments of the vehicle system may use edge computing to detect events of interest in real-time and, upon detecting such events, stores/uploads a richer set of corresponding data than would otherwise be stored/uploaded. The events of interest may be anomalous events that deviate from predictions (e.g., based on pre-recorded historical data) of the vehicle system by a threshold. The richer set of data may be high-resolution data including more information details than the data (e.g., the pre-processed, compressed data) stored/uploaded for non-anomalous events. The richer set of data may be, for example, raw data, full-resolution data, or data with higher resolution (e.g., more pixels, higher sampling rates) than the data stored/ uploaded for non-anomalous events. The edge computation may use machine-learning models or/and rule-based algorithms that are designed for detecting or classifying anomalous events. For example, the system may compare the current driving data with predicted driving behaviors (e.g., using a machine-learning model) under current situation and may identity an anomalous event when the current driving data is inconsistent with the prediction. When an anomalous event is detected, the system may store/upload a richer set of data related to the detected event.

Particular embodiments reduce the system demand on storage and bandwidth resources by selectively storing and uploading data based on the identified events and pro-processing other data not related to the identified events. For example, the vehicle system can effectively collect data including both edge-case data related to anomalous events and normal operation data for machine-learning training in spite of storage and transmission bandwidth limitations of the vehicle system. Furthermore, particular embodiments of the vehicle system provide a richer edge-case data set and better data quality for subsequent downstream use, such as training a machine-learning model for driving vehicles or assisting human driving. For example, the collected edge-case data may include high-resolution data of detected events with no loss from compression or pre-processing, and can, therefore, be more effectively used to train machine-learning models.

In particular embodiments, the vehicle system may have any number of sensors for monitoring the vehicle (e.g., speeds, steering angles, braking pressure, etc.), the vehicle path (e.g., trajectories, locations, etc.), the human driver (e.g., eye movement, head movement, etc.), and the environment of the vehicle (e.g., identified objects with bounding boxes, other vehicles, pedestrians, etc.). The vehicle system may include one or more computing systems (e.g., a data collection device, a mobile phone, a tablet, a mobile computer, a high-performance computer) to collect the contextual data of the vehicle. In particular embodiments, the contextual data of the vehicle may include one or more parameters associated with the human driver, for example, but not limited to, a head position, a head movement, a hand position, a hand movement, a foot position, a foot movement, a gazing direction, a gazing point, an image of the human driver, a gesture, a voice, etc. The parameters associated with the human drive may be measured using one or more driver-facing cameras and microphones associated with the vehicle (e.g., a dash camera with microphones) or associated with a computing system (e.g., a data collection device, a mobile phone) of the vehicle.

In particular embodiments, the contextual data of the vehicle may include one or more parameters associated with the vehicle, for example, a speed, a moving direction, a trajectory, a GPS coordination, an acceleration (e.g., based on IMU outputs), a rotation rate (e.g., based on IMU/gyroscope outputs), a pressure on the braking pedal, a pressure on the acceleration pedal, a steering force on the steering wheel, a wheel direction, a signal status, etc. The parameters associated with vehicle may be determined based on one or more sensors of the vehicle system. In particular embodiments, the contextual data of the vehicle may include navigation data of the vehicle, for example, a navigation map, a navigating target place, a route, an estimated time, a detour, etc. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, etc.

In particular embodiments, the contextual data of the vehicle may include one or more metrics associated with the vehicle environment. The environmental metrics may include, for example, but are not limited to, a distance to another vehicle, a relative speed to another vehicle, a distance to a pedestrian, a relative speed to a pedestrian, a traffic signal status, a distance to a traffic signal, a distance to an intersection, a road sign, a distance to a road sign, a distance to curb, a relative position to a road line, an object in a field of view of the vehicle, a traffic status (e.g., high traffic, low traffic), trajectories of other vehicles, motions of other traffic agents, speeds of other traffic agents, moving directions of other traffic agents, signal statuses of other vehicles, positions of other traffic agents, aggressiveness metrics of other vehicles, etc. The one or more metrics associated with the environment of the vehicle may be determined using on one or more cameras, LiDAR systems, radar systems, etc. As an example and not by way of limitation, the vehicle system may track relative positions of the vehicle to one or more road lines to precisely determine the location of the vehicle in addition to a navigation map. As another example, the vehicle system may evaluate the aggressiveness of other vehicles by tracking their velocities, moving directions, accelerations, trajectories, relative distances and relative positions to other objects or vehicles.

FIG. 1 illustrates an example vehicle system 100 with limited storage space and wireless connection bandwidth. The vehicle system 100 may include one or more processors 110, a communication module 140, an on-board storage 120 with limited storage space (e.g., gigabytes or terabytes), a wireless connection with limited bandwidth 152 to a cloud 150, etc. The vehicle system 100 may collect vast amount of data 160 from one or more sensors (e.g., speed sensors, steering angle sensors, braking pressure sensors, a GPS, cameras, LiDAR, radars, etc.) of the vehicle. In particular embodiments, the vehicle system 100 may collect contextual data of vehicles driven by human drivers and the collected data may be used to train a machine-learning (ML) model for driving vehicles (e.g., including driving an autonomous vehicle or assisting a human driver, such as providing safety warnings and automatic braking). The training of the machine-learning models may need data that covers vast driving scenarios and driving conditions. The training may be in the training system 190 coupled to the cloud 152. The collected data 160 may exceed the limitations of the storage space 120 and transmission bandwidth 152. The vehicle system 100 may directly store and upload a portion of the collected raw data to the cloud 150 to train the machine learning model in the training system 190. However, due to the limitations of the storage space and transmission bandwidth, the amount of data that can be stored or/and uploaded is very limited, relative to the large size of the raw data, and therefore may not be adequate for training the machine-learning models.

In particular embodiments, the vehicle system 100 may pre-process the collected data to a condense form before saving the data to non-volatile storage or uploading the data to a cloud through a wired or wireless connection. As an example and not by way of limitation, the vehicle system 100 may include one or more agent modelers (e.g., object detectors, object classifiers) to detect traffic agents (e.g., other vehicles, pedestrians, moving objects) in the environment of the vehicle. The agent modelers may be based on one or more machine-learning models (e.g., neural networks). The vehicle system 100 may use two-dimensional (e.g., based on cameras) and/or three-dimensional (e.g., based on LiDAR or stereo cameras) perceptions of the environment to detect and track the traffic agents (e.g., putting a 3D bounding box for each detected traffic agent, marking each traffic agent with velocity and moving direction). The vehicle system 100 may generate pre-process result data that represents information captured by the raw data in a condense form, for example, a detected object list including any number of detected objects. Each detected object in the list may include any number of components including, for example, but not limited to, an object profile, an object image segmentation, a semantic text description, a velocity, a moving direction, a position, etc. The data including information associated with the detected object may have a smaller size than the corresponding raw data (e.g., an object image). The vehicle system 100 may further generate a semantic map including the detected objects (e.g., other vehicle, pedestrians, moving objects) and their related parameters. Instead of saving or sending the raw data, the vehicle system 100 may save or/and upload the pre-processed result (e.g., an object list, a semantic map), which requires smaller storage space and less transmission bandwidth than the raw data. The pre-processed results may then be used for any downstream application, such as training a machine-learning model, building a statistical model, or being subject to human analysis.

In particular embodiments, the vehicle system 100 may compress the collected data (e.g., high-resolution raw images) to one or more compressed formats (e.g., JPEG, PNG) to reduce the requirement on storage space and transmission bandwidth. In particular embodiments, the vehicle system 100 may further compress the pre-processed result data to an even smaller size to reduce the requirement on storage space and transmission bandwidth. The vehicle system 100 may save the compressed data into non-volatile storage or/and upload to a cloud in real-time or at a later time.

In particular embodiments, the vehicle system 100 may use the pre-processed data or/and the compressed data to train the machine-learning models to learn vehicle driving. While the pre-processed data and the compressed data may carry a lot of useful information for training the machine-learning models, they may lack enough details for anomalous events (e.g., accidents, unusual driving conditions, operations deviating from predictions based on historical data, etc.), which may need higher level of detail than the pre-processed or compressed data. The anomalous events may include critical edge-case data for training the machine-learning models. Therefore, such one-size-fit-all approaches (e.g., pre-processing data, compressing data) may result in a suboptimal amount of data being collected for scenarios where richer data is needed.

Figure 2:
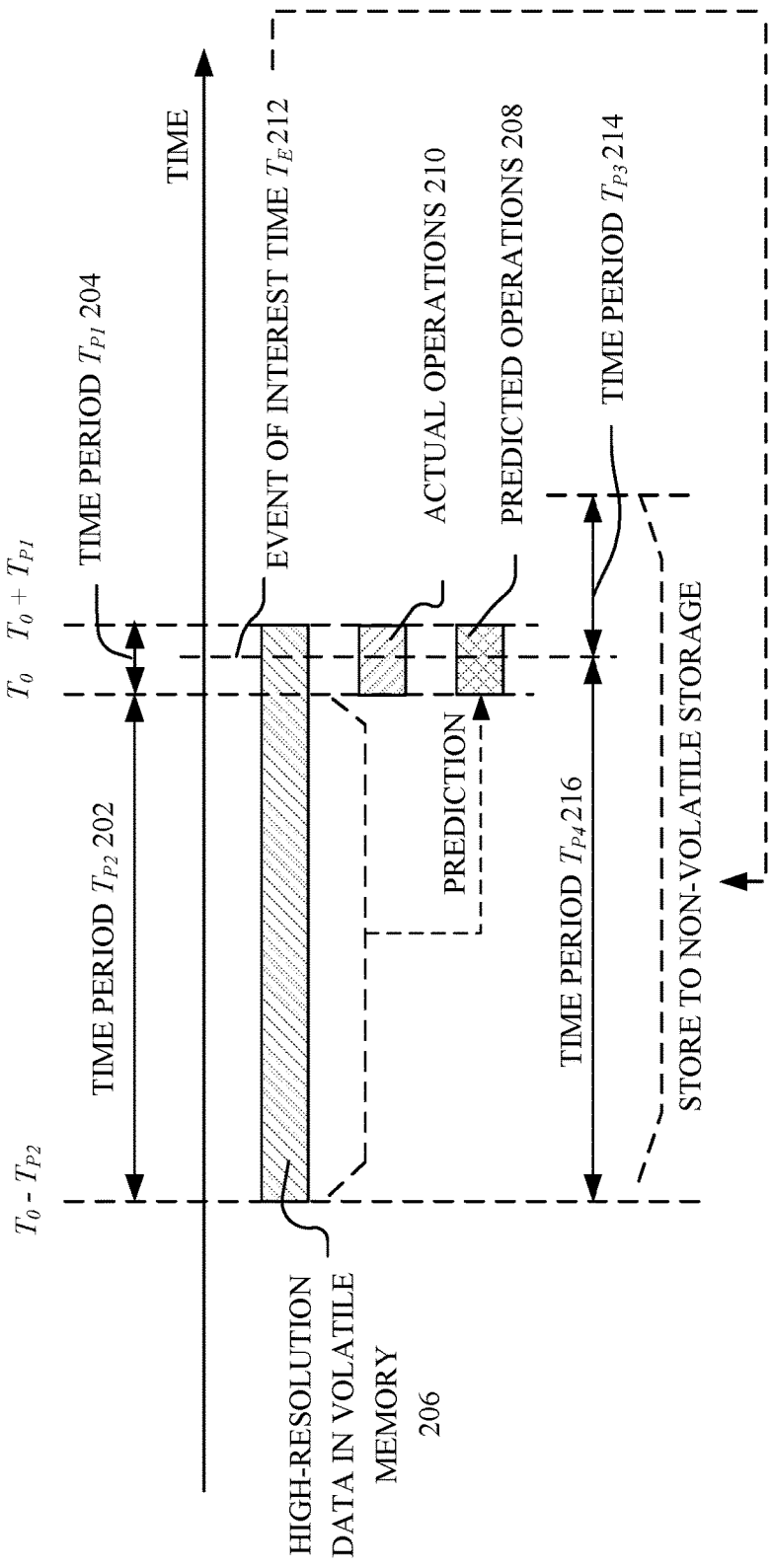
FIG. 2 illustrates an example time sequence for determining an event of interest based on predicted operations of human drivers.

In particular embodiments, the vehicle system may use one or more computing systems (e.g., a data collection device, a high-performance computer, a tablet, a mobile phone, etc.) to selectively collect contextual data of the vehicle based on one or more detected events of interest. FIG. 2 illustrates an example time sequence 200 for determining an event of interest based on predicted operations of human driver. The vehicle system may continuously collect the contextual data of the vehicle and store the latest contextual data 206 in a volatile memory of the vehicle system. The latest contextual data 206 stored in the volatile memory may include data gathered within a pre-determined period of time $T_{P2}$ 202 (e.g., 2 minutes, 5 minutes, 10 minutes) before a current time $T_0$. The contextual data 206 stored in the volatile memory may include high-resolution data from one or more sensors, for example, a series of full-resolution raw images or other non-compressed full-resolution raw data from one or more cameras. The non-volatile memory may be repeatedly overwritten with newer data and only store the high-resolution of the latest time period (e.g., 2 minutes, 5 minutes, 10 minutes) to accommodate the size limitation of the memory.

In particular embodiments, the vehicle system may access the contextual data 206 of the vehicle stored in the volatile memory and use a prediction model to predict one or more parameters related to the predicted operations 208 of the human driver in a time period $T_{P1}$ 204 (e.g., 0.1 seconds, 0.2 seconds, 2 seconds, 5 seconds) at and after the current time $T_0$. The parameters related to the predicted operations 208 may include, for example, but are not limited to, steering changes, pedal actions, breaking actions, signal changes, etc. The prediction model may predict one or more parameters related to the vehicle information, the vehicle path, or/and the environment of the vehicle. For example, the prediction model may predict, for the vehicle or/and other traffic agents, speeds, moving directions, accelerations, positions, trajectories, relative positions to road lines, etc. The prediction model may be trained by large amount (e.g., hundreds or thousands of training samples) of pre-recorded contextual data associated with a large number of human-driven vehicles (e.g., driven by a fleet of human drivers) or autonomous vehicles. The prediction model may be trained by pre-recorded vehicle operations associated with a large number of vehicles (e.g., human driven vehicles or autonomous vehicles). In particular embodiments, the prediction model may be an inference model of a machine-learning model (e.g., an artificial neural network, a recurrent neural network). The machine-learning model may be trained by the pre-recorded contextual data of a large number of human drivers. In particular embodiments, the vehicle system may predict the predicted operations of the human driver and the vehicle status based on pre-processed contextual data, compressed contextual data, or high-resolution contextual data.

In particular embodiments, the vehicle system may continue to collect the contextual data of the vehicle for the time period $T_{P1}$ 204 (e.g., 0.1 seconds, 0.2 seconds, 2 seconds, 5 seconds) and determine parameters related to the actual operations 210 of the human driver during the time period $T_{P1}$ 204. For example, the vehicle system may determine the vehicle information, the vehicle path information, and the environment information for the time period $T_{P1}$ 204. The vehicle system may compare the actual operations 210 and the predicted operations 208 of the human driver during the time period $T_{P1}$ 204 to determine whether an event of interest has happened during that time period. The vehicle system may determine that an event of interest has happened when the actual operations 210 of the human driver deviate from the predicted operations 208 for a pre-determined threshold. The vehicle system may determine that the latest contextual data 206 is associated with the detected anomalous event. For example, the prediction model may predict that the vehicle should be driving at a relative low speed (e.g., 10 mph to 30 mph) based on current driving situations, but the vehicle system finds that the vehicle is actually driving at a speed higher than 60 mph and the human driver is still hitting the accelerating pedal. As a result, the vehicle system may flag that as an anomalous event (e.g., at the time $T_E$ 212) and store the high-resolution data 206 (e.g., full-resolution raw data) related to that anomalous event.

In particular embodiments, upon the determination that an event of interest has occurred (e.g., at the time $T_E$ 212), the vehicle system may store the high-resolution contextual data (e.g., the contextual data 206) of the vehicle associated with the event of interest into a non-volatile storage of the vehicle system. As an example and not by way of limitation, the vehicle system may move the contextual data 206 in the volatile memory into the non-volatile storage of the vehicle system. The stored contextual data 206 may include the high-resolution data (e.g., a series of full-resolution raw images or raw sensor data without any compression) and therefore capture the richer details related to the event of interest. The vehicle system may further store high-resolution data corresponding to an additional time period $T_{P3}$ 214 (e.g., several seconds to several minutes) after the event of interest (e.g., at the time $T_E$ 212) so that the system may capture the event details both before (e.g., the time period $T_{P4}$ 216) and after the event (e.g., the time period $T_{P3}$ 214). The stored high-resolution data may be uploaded to a cloud through a wired or wireless connection in real-time or may be stored in the non-volatile storage for offline process at a later time. By selectively storing high-resolution data for only events of interest, particular embodiments use less storage and bandwidth resources to capture a richer data set for edge cases related to one or more driving conditions of the vehicle. The high-resolution data may be used to train the machine-learning models to account for such edge cases. The edge-case data captured based on the events of interest may be critical for training vehicle driving models and for evaluating and testing the readiness of the driving models for autonomous vehicles. In particular embodiments, the vehicle system may select the high-resolution contextual data to be stored based on the determination that the event of interest is associated with the contextual data. The high-resolution contextual data may comprise more information or may correspond to a longer time period than data normally stored when corresponding contextual data is determined to be unassociated with the event of interest. In particular embodiments, the vehicle system may flag (e.g., using digital marks) the high-resolution contextual data to be associated with the event of interest to be reviewed or analyzed at a later time.

In particular embodiments, the high-resolution data stored/uploaded by the vehicle system may include more information details than the low-resolution data (e.g., the pre-processed, compressed data) that is collected for non-anomalous events. In particular embodiments, the high-resolution data may be raw data from one or more sensors without pre-processing or compression. In particular embodiments, the high-resolution data may include high-resolution images which may have more pixels in each image than regular or low-resolution images. The high-resolution images may be full-resolution images using all the pixels available in an image sensor of a camera. In particular embodiments, the high-resolution data may be data generated by sensors using a higher sampling rate and therefore captures more information details of an event. In particular embodiments, the high-resolution data may be data generated by sensors with greater fields of view to capture larger scenes.

In particular embodiments, the high-resolution contextual data may be customized data collected based on the attention of the human driver. The vehicle system may dynamically allocate resources (e.g., time, sensors, cameras, transmission bandwidth, storage space) based on attention of the human driver. The vehicle system may determine one or more areas of interest where the human driver is paying attention based on the human driver's status or behaviors (e.g., head position, head movement, gazing direction). The vehicle system may allocate more resources (e.g., times, sensors, cameras, transmission bandwidth, storage space) to those areas of interest to capture a richer set of data that is more relevant to the current conditions. The vehicle system may select a contextual data set associated with the areas where the human driver is paying attention to be included in the high-resolution contextual data that will be stored. As an example and not by way of limitation, when the human driver looks at a particular direction while driving the vehicle, the vehicle system may allocate more cameras and bandwidth resources to the direction that the human driver is looking at. As another example, when the human driver looks at a particular direction while driving the vehicle, the vehicle system may configure cameras pointed to that direction to capture images with a higher resolution or/and a higher sampling rate.

In particular embodiments, the vehicle system may use edge computing to detect and classify events of interests in real-time. Edge computing may refer to computation carried out in local computing systems (e.g., a data collection device, a high-performance computer) of the vehicle system instead of in a cloud. For example, the vehicle system may include machine-learning models running in local processors (e.g., GPUs, CPUs, ML specific processors) to detect and classify anomalous events that deviate from predictions based on historical data. By using edge computing, particular embodiments may allow the vehicle system to selectively collect contextual data of the vehicle without real-time support from servers in a cloud and therefore, reduce the requirement on the communication bandwidth of the vehicle system. By using the localized computation for detecting the anomalous events, particular embodiments may have shorter response time to detecting normal and anomalous operation events by eliminating the delay time caused by communicating with a cloud.

Figure 3:
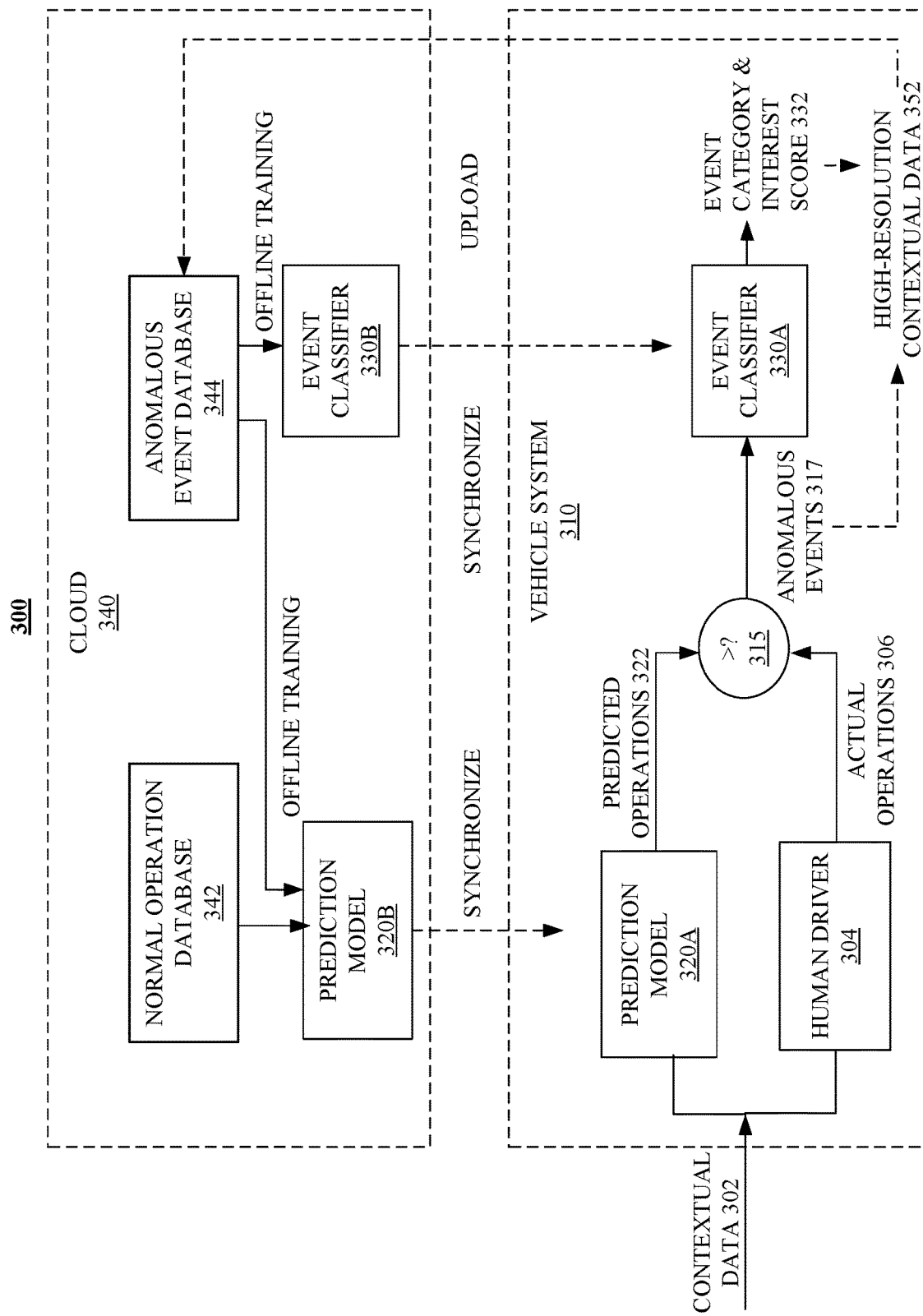
FIG. 3 illustrates an example edge computing diagram for detecting and classifying anomalous events.

FIG. 3 illustrates an example edge computing diagram 300 for detecting and classifying anomalous events. In particular embodiments, the vehicle system 310 may include a prediction model 320A which may be a machine-learning model running locally in the vehicle system 310. In particular embodiments, the prediction model may be trained using pre-recorded contextual data collected from a large number of human drivers. For example, the prediction model 320B, which is a copy of the prediction model 320A, may be trained and made available through the cloud 340 using the normal operation database 342 and the anomalous event database 344. The training databases 342 and 344 may include contextual data covering a large number of normal events and a large number of anomalous events, respectively. The normal events may include operations that are consistent with predictions based on historical data. The operations related to normal events may be predictable by the prediction model of the vehicle (e.g., within a threshold to the predicted operations). The training databases 342 and 344 may include an initial data set of normal and anomalous events which are labeled by human and/or another data set of normal and anomalous events automatically classified by machine-learning models. The training data may be constructed and optimized by weighting normal operation data and edge-case data differently, since edge-case data are typically sparse relative to normal operation data. For example, data related to edge cases may be assigned greater weights than data related to normal operations. The machine-learning models trained by weighted normal operation data and edge-case data may appropriately handle both the normal operation conditions and edge-case conditions. The training result may be synchronized from the cloud 340 to the local prediction model 320A in the vehicle system 310 through a wired or wireless connection.

In particular embodiments, the prediction model 320A may determine the predicted operations of the vehicle based on the contextual data 302 captured during a pre-determined time period (e.g., latest 5 minutes) or/and other pre-processed or compressed contextual data. The driving model may process the real-time or/and semi-real-time contextual data and generate predicted driving operations 322 for a future time period or/and a current time. The predicted driving operations (e.g., instructions for steering, braking, accelerating, parking, parameters related to the vehicle, the vehicle path, the human driver, or/and the environment) may be compared to the actual operations 306 of the human driver by a comparator 315 to determine anomalous events. The comparator 315 may identify an event as an anomalous event 317 when the actual operations 206 of the human driver deviate from the predicted operations 322 by a threshold amount. Upon a determination of an anomalous event, the vehicle system 310 may store the high-resolution contextual data 352 related to the detected anomalous event in non-volatile storage or/and upload the high-resolution contextual data to a cloud in real-time or at a later time.

As an example and not by way of limitation, when the vehicle makes a turn at an intersection, the prediction model 320A may predict a trajectory for the vehicle based on historical data. The vehicle system 310 may track the vehicle's location using a GPS and determine the vehicle's relative position to surrounding objects using LiDAR, cameras, etc. The comparator 315 may determine that the vehicle position deviates from the predicted trajectory by a distance greater than a pre-determined threshold distance (e.g., 5 meters, 10 meters, 15 meters). The comparator 315 may identify that as an anomalous event. Upon detection of the anomalous event, the vehicle system 310 may store the high-resolution contextual data related to the identified anomalous event in non-volatile storage or/and upload the high-resolution data into the cloud 340.

In particular embodiments, the vehicle system 310 may include an event classifier 330A to classify each detected anomalous event 317 according to one or more identified categories of the previously detected anomalous events and one or more characteristics of the currently detected event of interest. For example, the event classifier 330A may classify an event related to anomalous speeds as an anomalous speed event. As another example, the event classifier 330A may classify an event related to an anomalous trajectory as an anomalous trajectory event. The event classifier 300A may further determine an interest score for each detected anomalous event. The event classifier 330A may be another machine-learning model running locally on the vehicle system 310. In particular embodiments, the event classifier 330A may be a copy of an event classifier 330B, which may be trained and made available through the cloud 340. The event classifier 330B may be trained using the anomalous event database 344, which may include training samples of anomalous events labeled with the appropriate classifications. The training result may be synchronized from the cloud 340 to the local prediction model 330A in the vehicle system 310 through a wired or wireless connection.

In particular embodiments, the event classifier 330A may classify the detected event based on one or more parameters (e.g., speeds, trajectories, locations, surrounding objects, accelerations, etc.) determined based on the contextual data related to the detected event. The event classifier 330A may further determine a confidence score indicating a confidence level that the detected event belongs to a particular category. In particular embodiments, the event classifier 330A may further determine an interest score for a detected anomalous event to indicate the degree of interest of the detected event. The event classifier 330A may calculate the interest score based on the confidence score of the detected event belonging to the category and the corresponding interest score of that category. For example, if the detected event has a confidence score of x for belonging to a category and that category has an interest score of y (indicating degree of interest), the interest score of the detected event may be determined by a product of x and y. In particular embodiments, the interest score of an initial set of anomalous events may be manually determined and labelled by human to train the event classifier 330B. The event classifier 330A may determine interest scores for newly detected anomalous events based on the initial data set and other previously detected anomalous event data.

In particular embodiments, the vehicle system 310 may store/upload the high-resolution contextual data related to each detected anomalous event 317 identified by the comparator 315. In particular embodiments, the vehicle system 310 may determine whether to store/upload the high-resolution contextual data related to an anomalous event based on the event's interest score determined by the event classifier 330A. For example, the vehicle system 310 may store/upload the high-resolution contextual data related to an anomalous event only when the interest score is higher than a threshold value. In particular embodiments, the vehicle system 310 may determine the information detail levels of the contextual data to be stored/uploaded based on the interest score of the related anomalous event. For example, the vehicle system 310 may store/upload contextual data with higher resolutions for the anomalous events having higher interest scores than for the anomalous events having lower interest scores.

In particular embodiments, the event classifier may fail to classify a detected anomalous event because the detected anomalous event is not similar to any previously detected event (e.g., indicated by a low confidence score to any known anomalous event category). In this situation, the event classifier may create a new category based on the detected event and assign a high interest score to the detected event since being non-similar to all known anomalous events is an indication of an anomaly itself. The vehicle system may collect and save related high-resolution data related to any unclassifiable events. For example, the vehicle system may identify a rolling tire on the road within a distance to the vehicle. The event classifier may fail to classify the rolling tire event as any known categories. The event classifier may identify that as a new type of anomalous event and assign a high interest score to that event.

In particular embodiments, the prediction model 320B and/or event classifier 330B may be updated based on newly gathered data. In particular embodiments, the initial training data set for normal operations and anomalous events may be labelled by human. When the vehicle system collects new contextual data, the newly collected data may be uploaded to the training database 342, 344. For example, the vehicle system 310 may collect high-resolution contextual data 352 related to anomalous event 317 and upload the collected high-resolution contextual data 352 to the anomalous event database 344 in the cloud 340. Similarly, contextual data determined to be related to normal events may be uploaded to the normal operation database 342. The machine-learning models including both the prediction model 320B and the event classifier 330B may be further trained by the newly collected data and therefore, both improve over time the capability for handling anomalous events. The trained prediction model 320B and event classifier 330B may be synchronized to the corresponding prediction model 320A and event classifier 330A which run locally on the vehicle system 310.

Figure 4A:
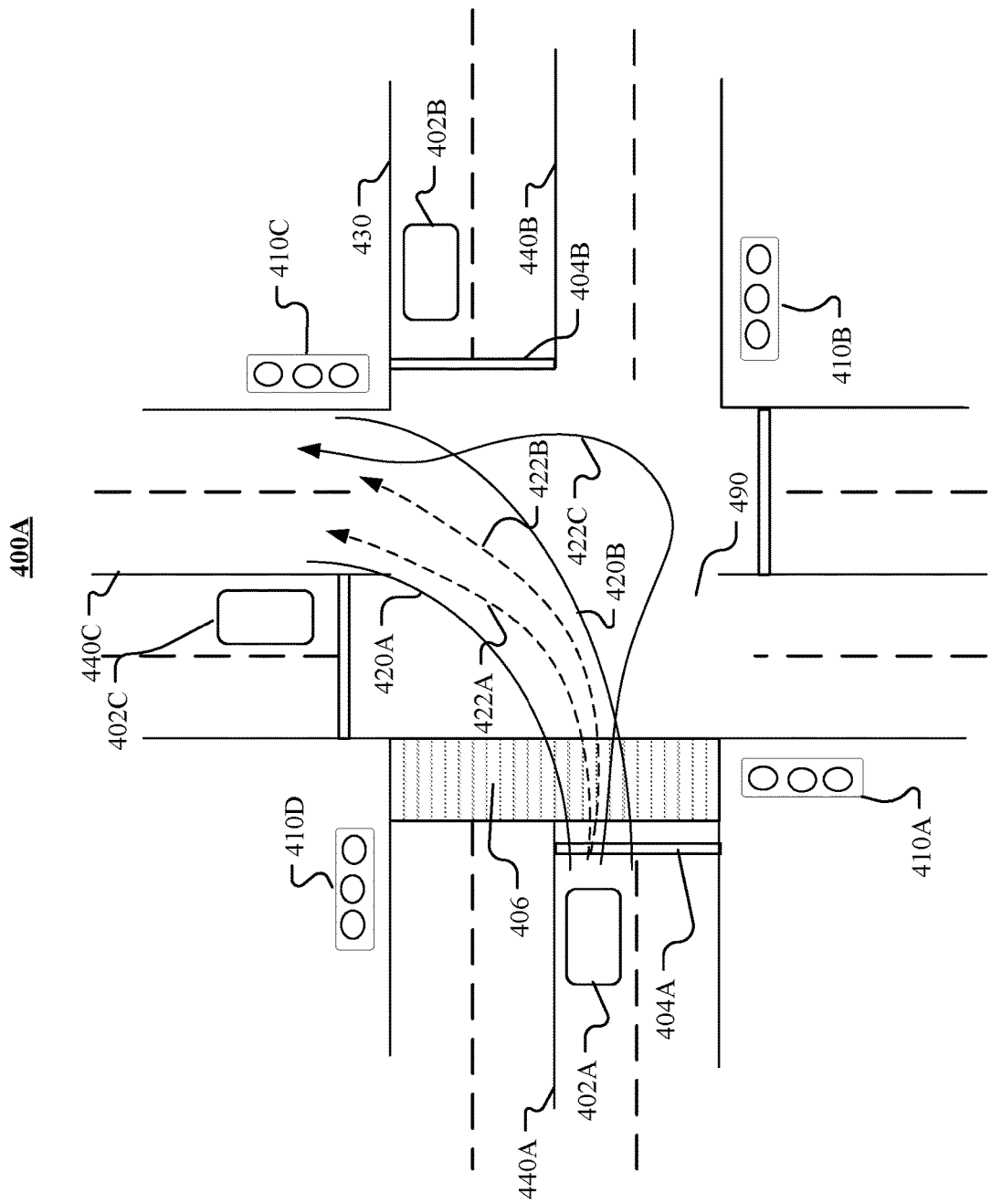
FIG. 4A illustrates an example situation for detecting anomalous events of a vehicle.

FIG. 4A illustrates an example situation 400A for detecting anomalous events of a vehicle. The vehicle 402A may approach an intersection 490 having other traffic agents (e.g., 402B, 402C), one or more stop lines (e.g., 404A, 404B), multiple traffic signals (e.g., 410A, 410B, 410C, 410D), one or more crosswalks 406, curbs 430, road lines 440A-C, etc. The vehicle 402A driven by a human driver may include a computing system which may map the environment of the vehicle using one or more sensors and use the real-time sensor information to localize the map. The computing system may monitor the vehicle information, for example, the velocity, the moving direction, the acceleration, the distance to stop line 404, the distance to the road line 440A, etc. The computing system may collect the contextual data of the vehicle and predict the vehicle operations based on the collected contextual data. As an example and not by way of limitation, the computing system may monitor the planned route of the vehicle through a navigation device (e.g., a mobile phone, a GPS). The prediction model may infer that the vehicle 402A will make a left turn at this intersection 490 based on the target location of the navigating route and the turning signal status of the vehicle (e.g., accessed through the CAN bus of the vehicle). As another example, the prediction model may infer that the vehicle 402A will make a left turn at the intersection 490 based on activities of the human driver (e.g., the driver is looking toward the left-front direction corresponding to a left turn) and other environment factors (e.g., other traffic agents are stationary obeying traffic lights, no pedestrians etc.).

As an example and not by way of limitation, the computing system may predict that the vehicle 402A will make a left turn at the intersection 490. The computing system may use a prediction model to predict that the vehicle 402A will likely have a trajectory between the lines 420A and 420B. The prediction model may be trained by the historical data related to left turns made by vehicles at this intersection 490 or other intersections. For example, the typical trajectories for making a left turn may be the trajectory 422A or 422B depending on which lane the driver plans to turn into. The computing system may continue to monitor the operations of the human drive and the status of the vehicle 402A. During the actual left-turning process, the computing system may detect that the vehicle 402A is making a left turn using a trajectory 422C, which is beyond the predicted boundary lines of 420A and 420B. The computing system may identify that as an anomalous event and save the related high-resolution data as new edge-case data. The computing system may further use the event classifier to classify the detected anomalous event as an anomalous trajectory event and assign a high interest score to the event.

As another example, the computing system may detect (e.g., using one or more agent modelers) that a traffic agent (e.g., a car, a truck) or a person (e.g., walking or riding a bicycle on the crosswalk 406) is in front of the vehicle 402A while the vehicle is approaching at a high speed. The computing system may include a prediction model trained by historical data related to slowing-down processes made by vehicles when facing obstacle objects. The computing system may predict, using the prediction model, that the vehicle 402A will slow down beyond a threshold distance to the detected traffic agent or person. However, the computing system detects that the vehicle 402A is approaching the traffic agent or person at a high speed after the vehicle is within the threshold distance to the traffic agent or person. The computing system may identify that as an anomalous event and store the related high-resolution data. The event classifier may classify this anomalous event as an anomalous speed event and assign a high interest score to the event.

As another example, the computing system may detect the traffic signal for the vehicle 402A has just turn green while the vehicle 402A is stopping at the intersection 490 waiting for the left turn signal. The computing system may use a prediction model to predict that the vehicle 402A will proceed to turn left with a threshold time period (e.g., 1 seconds, 2 seconds) after the traffic signal has turned green. The prediction model may be trained by the historical data related to left turns made by vehicles at this intersection 490 or other intersections. However, the computing system detects that the vehicle 402A keeps stopping at the intersection 490 for a period of time (e.g., 5 seconds, 10 seconds, 20 seconds, 30 seconds) longer than the threshold time period (e.g., 1 seconds, 2 seconds) after the traffic signal has turned green. The computing system may identify that as an anomalous event and store the related high-resolution data. The event classifier may classify this event as an anomalous stop event and assign a high interest score to the event.

In particular embodiments, the computing system may use rule-based algorithms to detect anomalous events. For example, the computing system may detect that the human driver is hitting the braking pedal unusually hard and may identify that as an anomalous event. As another example, the computing system may determine that the vehicle has arrived at a wrong location different from the navigation target and may identify that as an anomalous event. As another example, the computing system may determine that a collision accident has happened (e.g., based on an IMU output, an airbag status) and identify that as an anomalous event. In particular embodiments, the computing system may adopt a hybrid approach of ruled-based detection and model-based detection for detecting and classifying anomalous events.

In particular embodiments, the computing system may use one or more traffic agent modelers to detect and analyze other traffic agents (e.g., 402B, 402C) in the environment. The agent modelers may detect and identify other traffic agents (e.g., cars, buses, pedestrians), predict their behaviors (e.g., speeds, trajectories, positions), and evaluate the aggressiveness of their behaviors. In particular embodiments, the agent modelers may be one or more machine-learning models trained to detect and analyze different traffic agents. The agent modelers may further analyze and predict the interaction between other traffic agents (e.g., 402B, 402C) and the hosting vehicle (e.g., 402A).

Figure 4B:
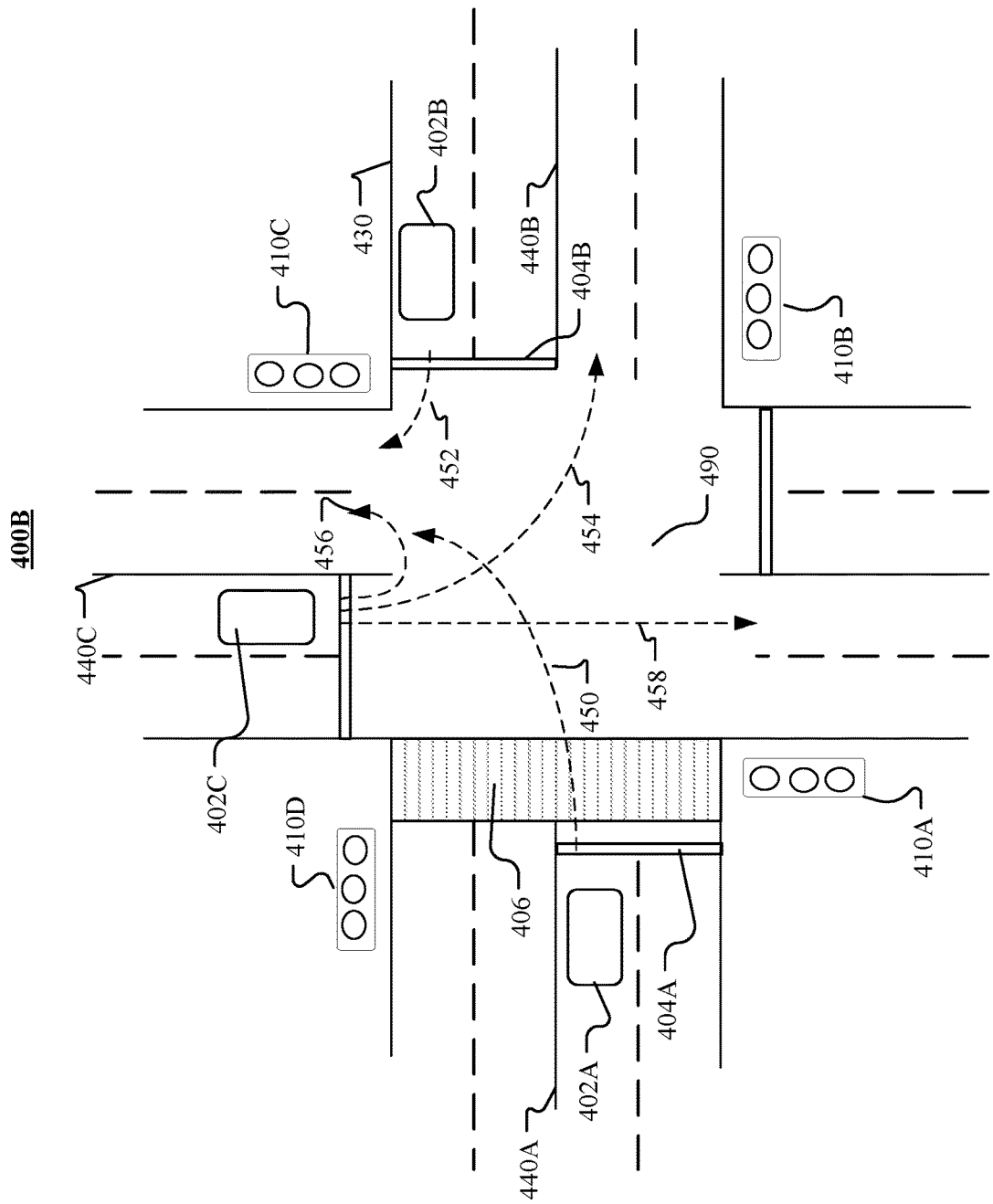
FIG. 4B illustrates an example situation for predicting other traffic agent behaviors.

FIG. 4B illustrates an example situation 400B for predicting other traffic agent behaviors. The vehicle 402A may approach the intersection 490 and will make a left turn (e.g., along a trajectory 450). The agent modeler may predict a behavior of a traffic agent based on the lane that the traffic agent is in, the distance between the traffic agent to a curb or center line, the turning signal status of that traffic agent, etc. As an example and not by way of limitation, the agent modeler may detect that the traffic agent 402B is within the right lane of the road and is very close to the curb 430. The agent modeler may predict that the traffic agent 402B is likely to turn right along the trajectory 452. However, the agent modeler may detect that the traffic agent 402B has its left-turning signal flashing. The computing system may identify that as an anomalous event. As another example, the agent modeler may detect that the traffic agent 402C is within the left lane and has left-turning signal flashing. The agent modeler may infer that the traffic agent 402C would likely either turn left along the trajectory 454 or make a U-turn along the trajectory 456. However, the agent modeler may detect that the traffic agent 402C moves straight forward (e.g., along the path 458) instead of turning left and may identify that as an anomalous event.

As another example, when the vehicle 402A is approaching the intersection 490, the computing system of the vehicle 402A may use agent modelers to detect that the traffic agent 402B (e.g., a car) is approaching the stop line 404B at an unusual high speed. The agent modelers may predict that although the traffic agent 402B is slowing down, it is unlikely to make a safe stop at the stop line 404B because of its high speed and the short distance between the traffic agent 402B and the stop line 404B. The computing system may identify this as an anomalous event and classify this event as an aggressive traffic agent event. As another example, the agent modelers may detect a traffic agent or object that cannot be recognized or classified. The computing system may identify the unrecognizable traffic agent or object as an anomalous event.

In particular embodiments, the computing system may use multi-channel images to predict a discretized view of the environment of the vehicle. For example, the computing system may generate (e.g. using prediction models, traffic agent modelers, machine-learning models) to generate a series of multi-channel images for predicting the vehicle environment (e.g., other traffic agents, pedestrians, etc.) and the vehicle status (e.g., locations, speeds, moving directions, relative positions to road lines, relative positions to surrounding objects, etc.). The computing system may predict where the vehicle is going to be and how the environment looks like in a short time period (e.g., 0.1 seconds, 0.2 seconds, 2 seconds, 5 seconds, 10 seconds, etc.). The computing system may predict the vehicle's speed and moving direction based on a set of hypotheses with corresponding probability. The potential hypothesis may be generated by convolutional neural networks or re-current neural networks which may feed new information to the network. The hypothesis may be based on both the current view of the road and earlier view of the road. For example, the computing system may generate multiple channel images for a current time T or/and for a previous time (e.g., T–0.5 seconds, T–1 second). In particular embodiments, the computing system may predict vehicle operations based at least in part on the predicted discretized view of the environment of the vehicle.

In particular embodiments, the computing system may use a combination of features related to the vehicle, the environment, or/and other traffic agents to predict the environment of the vehicle (e.g., in a discretized or non-discretized view). The combination of the features may include one or more of, for example, but are not limited to, a current position of the vehicle, a past position of the vehicle, a predicted position of the vehicle, a current velocity of the vehicle, a past velocity of the vehicle, a predicted velocity of the vehicle, velocities and orientations of other traffic agents relative to the vehicle, velocities and orientations of other traffic agents relative to each other, velocities and orientations of other traffic agents relative to one or more map elements (e.g., lane markings, stop lines, pedestrian crossings, signals, road signs, intersections, road edges, buildings, road barriers), etc. The computing system may generate a combination of one or more features related to the vehicle, the environment, or/and other traffic agents and predict a discretized or non-discretized view of the vehicle environment based on the combination of the features. In particular embodiments, the computing system may predict vehicle operations based at least in part on the predicted view of the vehicle environment.

In particular embodiments, the computing system may look at each individual position of the traffic agents to predict possible environment situations in a short period of time. The computing system may use agent modelers to identify the traffic agents and other objects near the vehicle and use a prediction model to predict where the traffic agents might be going (e.g., locations, speeds, moving directions, relative positions to road lines, relative positions to surrounding objects, etc.). The computing system may collect the contextual data of the vehicle related to the human driver's operations in response those traffic agents and predict the vehicle status (e.g., locations, speeds, moving directions, relative positions to road lines, relative positions to surrounding objects, etc.) based on the collected contextual data of the vehicle and the operations of the human driver. In particular embodiments, the traffic agent modelers and prediction models may be machine-learning models trained by historical contextual data of the vehicle. In particular embodiments, the prediction model may be trained by historical multi-channel images comprising multi-layer information about the vehicle and the environment.

In particular embodiments, the computing system may generate one or more multi-channel images for the vehicle environment (e.g., an intersection) including the vehicle itself, stop lines, road lines, other traffic actors or agents, etc. Each multi-channel image may be a top view environmental image and may have multiple channels for different layers of information for the environment. A first channel of the image may include the road information indicating the boundary of the road (e.g., which areas belong to road and which areas are not roads). For example, the first channel of the image may include, but are not limited to, road lines, crosswalks, curbs, sidewalks, road edge areas beyond the road, etc. A second channel of the image may include information associated the traffic and the road, for example, the vehicle itself (e.g., locations, relative positions to surrounding objects), other traffic agents (e.g., locations, relative positions to surrounding objects), stop lines, traffic signals, road signs, etc. A third channel may include information related to traffic agents, for example, velocities, moving directions, accelerations, turning signal statuses, interactions, etc. The machine-learning models may use multi-channel images to predict how the exact scene will be look like in a short period of time (e.g., 0.1 second, 0.2 second) in a discretized view of world. The computing system may generate a series of top view of the environment to predict a series of future scenes of the environment.

In particular embodiments, the computing system may compare the precited vehicle and environment status to the actual vehicle and environment status. The computing system may generate a series of multi-change images for the actual top view of the environment based on the actual vehicle and environment status determined using the latterly collected contextual data of the vehicle. The computing system may compare the predicted top view images and the actual top view images and may determine an anomalous event when an actual top view image deviates from its corresponding predicted top view image with a difference greater than a threshold. The computing system may use one or more information layers of the multi-channel images for the comparison between the predicted and actual top view images of the environment. As an example and not by way of limitation, the computing system may determine, based on the actual and precited environment top view images, that the vehicle location deviates from a precited location by a distance greater than a threshold distance (e.g., 5 meters, 10 meters, 15 meters). The computing system may determine that as an anomalous event and may store/upload high-resolution data related to the detected anomalous event. As another example, the computing system may determine, based on the actual and precited environment top view images, that another vehicle deviates from a precited trajectory of that vehicle by a distance greater than a threshold distance (e.g., 5 meters, 10 meters, 15 meters, 30 meters). The computing system may determine that as an anomalous event and store/upload high-resolution data related to the identified anomalous event.

Figure 5:
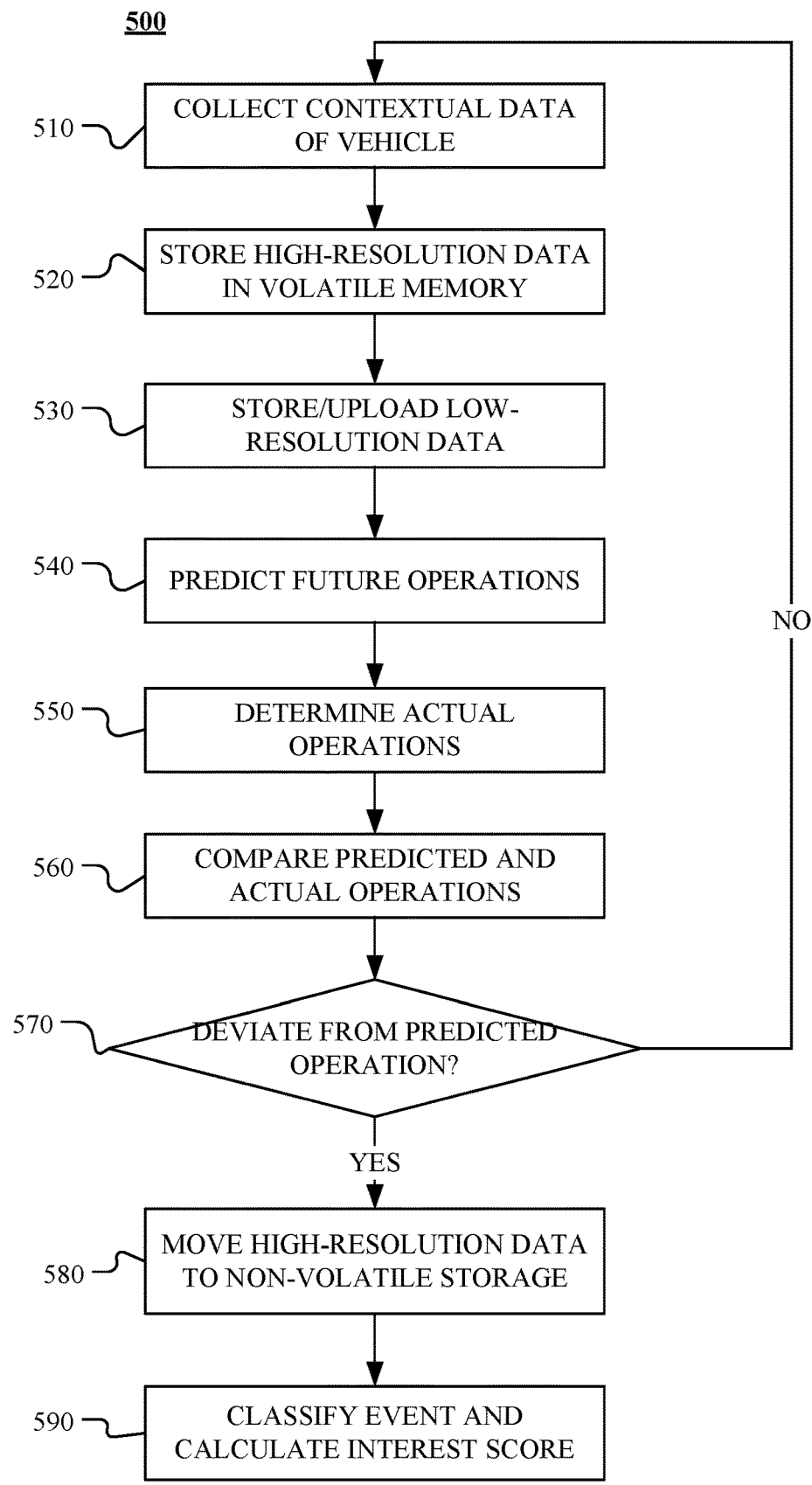
FIG. 5 illustrates an example method of detecting an event of interest and storing high-resolution data associated with the event.

FIG. 5 illustrates an example method of detecting an event of interest and storing high-resolution data associated with the event. At step 510, the vehicle system may collect the contextual data of the vehicle based on one or more sensors associated with the vehicle system. The collected contextual data may include high-resolution data (e.g., full-resolution raw data without compression or pre-processing) from the sensors for monitoring the vehicle, the vehicle path, the human driver, and the environment. At step 520, the vehicle system may store the latest high-resolution data (e.g., 5-minute worth of data) in a volatile memory. The high-resolution data in the volatile memory may be overwritten by newer data and volatile memory may only store the latest 5-minute high-resolution to accommodate to its size limitation. At step 530, the vehicle system may store low-resolution data in a non-volatile storage of the vehicle system or upload the low-resolution data to a cloud in real-time. The low-resolution data may be pre-processed data (e.g., object identification results) or compressed data generated based on the high-resolution contextual data. At step 540, the vehicle system may use a prediction model to predict the future operations of the human driver for a time period (e.g., 0.1 seconds, 0.2 seconds, 2 seconds, 5 seconds). The prediction model may be a machine-learning model trained using historical data. The vehicle system may continue to monitor the vehicle status and collect contextual data of the vehicle. At step 550, the vehicle system may determine the actual operations of the human driver based on the collected data of the vehicle during that time period (e.g., 0.1 seconds, 0.2 seconds, 2 seconds, 5 seconds). At step 560, the vehicle system may compare the predicted operations and the actual operations of the human driver to determine whether an event of interest has happened.

At step 570, when the actual operations of the human driver deviate from the predicted operations for a pre-determined threshold, the vehicle system may identify an anomalous event. When the actual operations of the human driver are consistent with the predicted operations (e.g., within a pre-determined threshold), the vehicle system may jump to step 510 and continue to collect contextual data of the vehicle. At step 580, the vehicle system may store the high-resolution data related to the identified event of interest into a non-volatile storage. For example, the vehicle system may move the high-resolution data in the volatile memory into a non-volatile storage (or upload the data to a cloud). The high-resolution data in the volatile memory may include a richer set of data of a pre-determined time period (e.g., 5 minutes) before the event of interest. In particular embodiments, the vehicle system may further collect and store high-resolution data for a second period of time (e.g., several seconds to several minutes) after the event of interest has happened. At step 590, the vehicle system may use an event classifier to classify the detected event of interest (e.g., an anomalous event) and determine an interest score indicating the importance and degree of interest of the detected event.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for detecting an event of interest and storing high resolution data associated the event including the particular steps of the method of FIG. 5, this disclosure contemplates any suitable method for detecting an event of interest and storing high resolution data associated the event including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
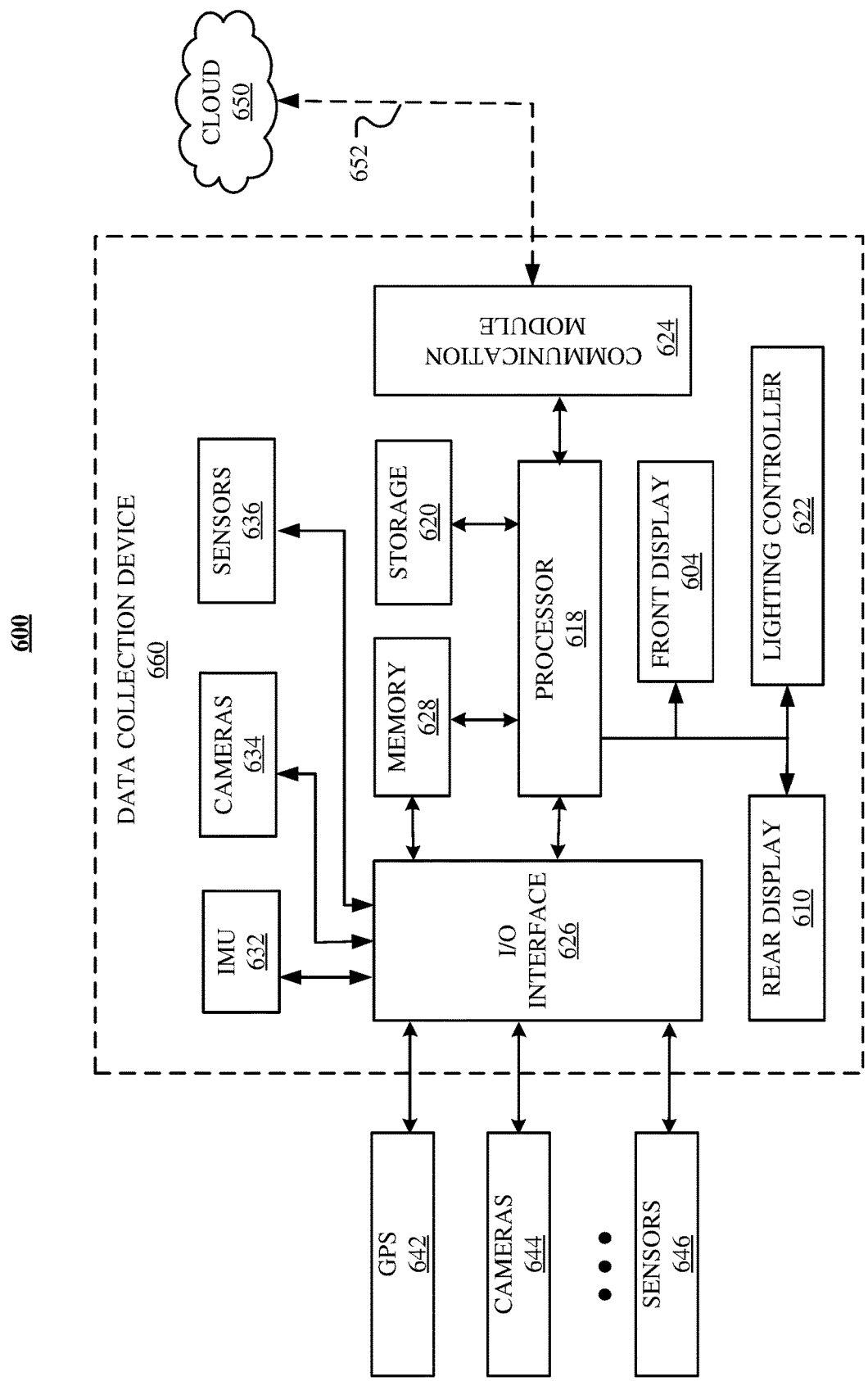
FIG. 6A illustrates a block diagram of various components of an example data collection device.

FIG. 6A illustrates a block diagram of various components of an example data collection device 660. The data collection device 660 may also be referred as a transportation management vehicle device. In particular embodiments, the data collection device 660 may be integrated with the vehicle as a built-in device or may be associated with the vehicle as a detachable system. In particular embodiments, the data collection device 660 may include a number of sub-systems and modules including, for example, a logic control module (e.g., a processor 618, input/output (I/O) interface 626), a data storage module (a volatile memory 628, a non-volatile storage 620), a sensing module (e.g., an inertial measurement unit 632, cameras 634, sensors 636), a communication module 624, a display module (e.g., a front display 604, a rear display 610, a lighting controller 622), etc. In particular embodiments, the processor 618 may control the I/O interface 626 to collect data from both of the integrated sensors (e.g., IMU 632, cameras 634, sensors 636) that are integrated with the data collection device 660 and the vehicle sensors (e.g., a GPS 642, cameras 644, sensors 646) that are associated with the vehicle and communicate with the data collection device 660. The data collection device 660 may store the collected data in the volatile memory 628 (e.g., a random-access memory (RAM)) or/and in the non-volatile storage 620 (e.g., a hard disk drive, a solid-state drive, a flash drive, a compact disk, etc.). The data collection device 660 may also upload the collected data to a cloud 650 using the communication module 624 and through a wired or wireless connection 652 in real-time or at a later time.

In particular embodiments, the data collection device 660 may include one or more machine-learning models (e.g., prediction models, driving models, event classifier, traffic agent modelers, etc.) which may require considerable computational resources. In particular embodiments, the data collection device 660 may cooperate with another computing system (e.g., a mobile phone, a tablet, a mobile computer, a high-performance computer) for collecting and processing the data (e.g., running traffic agent modelers). In particular embodiments, the data collection device 660 may be implemented on a mobile phone or mobile computer using the API of that mobile phone or mobile computer. In particular embodiments, the data collection device 660 may be implemented on an embedded system platform including one or more GPUs or other processors which are specifically configured to run machine-learning models (e.g., neural networks).

In particular embodiments, the vehicle system 600 may include one or more sensors for monitoring the vehicle information (e.g., speeds, steering angles, braking pressure, etc.), the vehicle path information (e.g., trajectories, locations, etc.), the human driver (e.g., eye movement, head movement, etc.), and the environment of the vehicle (e.g., identified objects with bounding boxes, other vehicles, pedestrians, etc.). In particular embodiments, the data collection device 660 may include one or more integrated sensors, for example, an inertial measurement unit 632, cameras 634, sensors 636, etc. The data collection device 660 may communicate with one or more sensors (e.g., a GPS 642, cameras 644, sensors 646, etc.) that are associated with the vehicle but are external to the data collection device 660. The vehicle system 600 may further include other sensing systems like LiDAR and radar systems. The sensors or sensing systems may monitor both the internal status (e.g., the vehicle itself and the passenger compartment area of a vehicle designed and intended for the seating of the driver and other passengers) and the external environment of the vehicle. For example, the data collection device 660 may include a rear-facing wide-angle camera that captures the passenger compartment and any passengers therein. As another example, the data collection device 660 may include a microphone that captures conversation and/or sounds in the passenger compartment. The data collection device may also include an infrared sensor capable of detecting motion and/or temperature of the passengers. Other examples of sensors may include, for example, but are not limited to: cameras for capturing visible data; microphones for capturing audible data; infrared sensors for detecting heat emitted by passengers; gyroscopes and accelerometers for detecting vehicle motion; speed sensors for detecting vehicle speed; steering sensors for measuring steering operations; pressure sensors for measuring pressure applied on braking pedal and acceleration pedal; a GPS for tracking vehicle location; and any other sensors or sensing systems (e.g., radar and LiDAR systems) suitable for monitoring the vehicle, the human driver, and the environment.

In particular embodiments, such sensors may be integrated with the vehicle system 600 which may be a human-driven vehicle or an autonomous vehicle. The sensors may be located at any suitable location, such as in the upper corners of the passenger compartment, the dashboard, seats, side doors, ceiling, rear view mirror, central console, floor, roof, lid, or any other locations where the sensor would be effective in detecting the type of signals it is designed for. In particular embodiments, such sensors may be integrated with a detachable computing device (e.g., a mobile phone, a tablet, a GPS, a dash camera) attached to the vehicle (e.g., on dashboard).

In particular embodiments, the communication module 624 may manage communications of the data collection device 660 with other systems including, for example, the cloud 650, a detachable computing device (e.g., a mobile phone, a tablet), a vehicle, the transportation management system, and third-party systems (e.g., music, entertainment, traffic, and/or maps providers). In particular embodiments, communication module 624 may be configured to communicate over WI-FI, Bluetooth, NFC, RF, LTE, 3G/4G/5G broadband cellular network or any other wired or wireless communication networks or protocols. In particular embodiments, the data collection device 660 may communicate with the vehicle through the communication module 624 to collected data from the sensors of the vehicle. In particular embodiments, the data collection device 660 may communicate with the cloud 650 through the communication module 624 for uploading data to the cloud 650 and synchronizing parameters related to one or more machine-learning models trained in the cloud 650.

In particular embodiments, the data collection device 624 may be configured to physically connect to the vehicle (e.g., through a connector 616 in FIG. 6C) for communicating with and getting power from the vehicle. For example, the connector 616 may implement the controller area network (CAN) bus interface or any other suitable communication interface or protocol for communicating with a vehicle. The CAN bus interface may interface with an on-board diagnostics (OBD) port (e.g., an OBD-I port, an OBD-II port, etc.) of the vehicle. In particular embodiments, the connector may include one or more universal serial bus (USB) ports, lightning connector ports, or other ports enabling users to directly connect their devices to the data collection device 660 (e.g., to exchange data, verify identity information, provide power, etc.). In particular embodiments, the data collection device 660 may be able to issue instructions (e.g., through the connector 616 in FIG. 6C) to the vehicle's onboard computer and cause it to adjust certain vehicle configurations. In particular embodiments, the data collection device 660 may be configured to query the vehicle (e.g., through the connector 616 in FIG. 6C) for certain data, such as current configurations of any of the aforementioned features, as well as the vehicle's speed, fuel level, tire pressure, external temperature gauges, navigation systems, and any other information available through the vehicle's computing system.

In particular embodiments, the data collection device 660 may include an input/output interface (I/O) 626 configured to receive inputs from and output instructions to sensors, users, or/and the vehicle. The I/O interface may include circuits and components for communication and signal conversion (e.g., analog-to-digital converters, digital-to-analog converters). The I/O interface 626 may be connected to the integrated sensors (e.g., an IMU 632, cameras 634, sensors 636) and the vehicle sensors (e.g., a GPS 642, cameras 644, sensors 646) for sending instructions to and receiving data from these sensors. For example, the I/O interface 626 may be connected to an image-capturing device configured to recognize motion or gesture-based inputs from passengers, a microphone configured to detect and record speech or dialog uttered, a heat sensor to detect the temperature in the passenger compartment, and any other suitable sensors. As another example, the I/O interface 626 may include an audio device configured to provide audio outputs (such as alerts, instructions, or other information) to users and/or receive audio inputs, such as audio commands, which may be interpreted by a voice recognition system or any other command interface.

In particular embodiments, the data collection device 660 may include one or more displays as shown in FIGS. 1B-C. The data collection device 660 may include a front display 604, a rear display 610, and a lighting controller 622. The front display 604 may be designed to face the outside of the vehicle so that it is visible to, e.g., ride requestors, and the rear display 610 may be designed to face the interior of the vehicle so that it is visible to, e.g., the passengers. The processor 618 may control information displayed on the rear display 610 and front display 604. As described herein, each display may be designed to display information to different intended users, depending on the positioning of the users and the data collection device 660. The data collection device 660 may control the front and rear display 604 and 610 based on display data of the data collection device 660. The display data may include stored display patterns, sequences, colors, text, animation or other data to be displayed on the front and/or rear display. The display data may also include algorithms for generating content and controlling how it is displayed. The generated content, for example, may be personalized based on information received from the transportation management system, any third-party system, the vehicle, and the computing devices of the provider and/or requestor. In particular embodiments, display data may be stored in the volatile memory 628 (e.g., a random-access memory (RAM)) or/and in the non-volatile storage 620 (e.g., a hard disk drive, a solid-state drive, a flash drive, a compact disk, etc.)

Figure 6B:
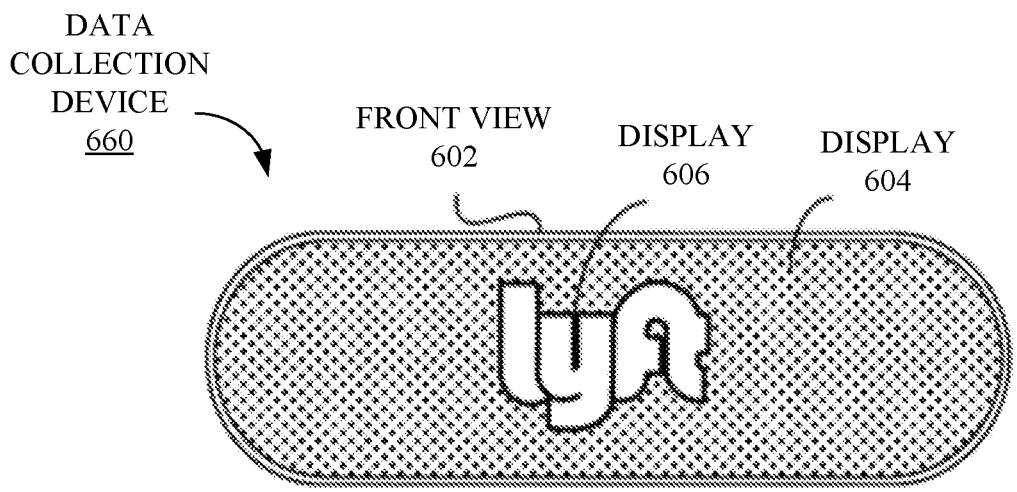
FIG. 6B illustrates a front view of an example data collection device.

FIG. 6B illustrates a front view 602 of an example data collection device 660. A front view 602 of the data collection device 660 may include a front display 604. In particular embodiments, the front display 604 may include a secondary region or separate display 606. As shown in FIG. 6B, the front display 604 may include various display technologies including, but not limited to, one or more liquid crystal displays (LCDs), one or more arrays of light emitting diodes (LEDs), AMOLED, or other display technologies. In particular embodiments, the front display 604 may include a cover that divides the display into multiple regions. In particular embodiments, separate displays may be associated with each region. In particular embodiments, the front display 604 may be configured to show colors, text, animation, patterns, color patterns, or any other suitable identifying information to requestors and other users external to a provider vehicle (e.g., at a popular pick-up location, requestors may quickly identify their respective rides and disregard the rest based on the identifying information shown). In particular embodiments, the secondary region or separate display 606 may be configured to display the same, or contrasting, information as front display 604.

Figure 6C:
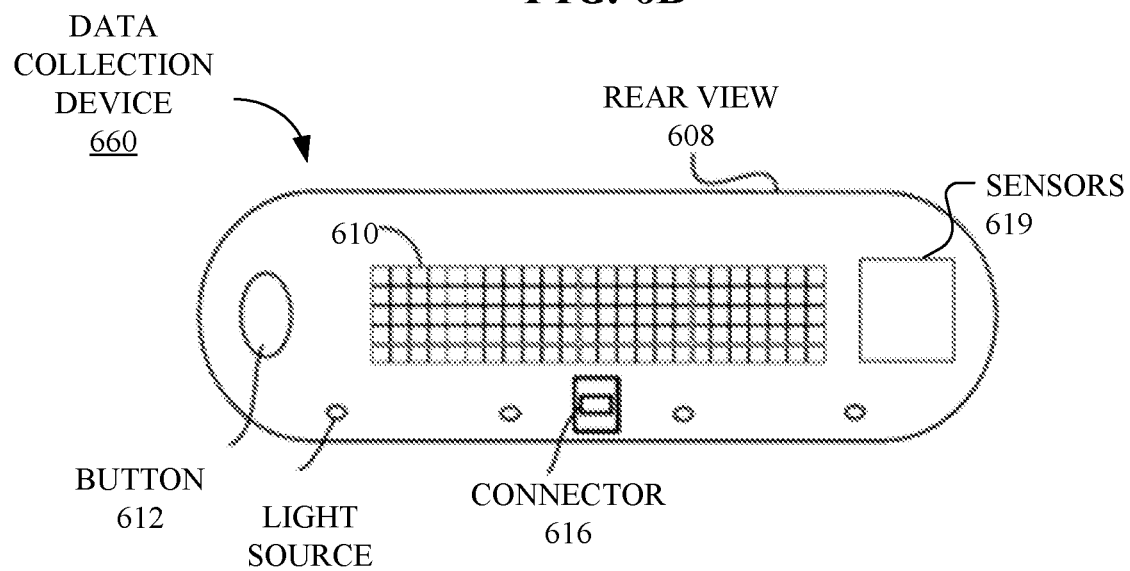
FIG. 6C illustrates a rear view of an example data collection device.

FIG. 6C illustrates a rear view 608 of an example data collection device 660. The rear view 608 may include a rear display 610, a button 612, one or more light sources 614, a connection 616, and one or more sensors 619. As with the front display 604, the rear display 610 may include various display technologies including, but not limited to, one or more liquid crystal displays (LCDs), one or more arrays of light emitting diodes (LEDs), AMOLED, or other display technologies. The rear display 610 may be configured to display information to the provider, the requestor, or other passengers in the passenger compartment of the vehicle. In particular embodiments, rear display 610 may be configured to provide information to people who are external to and behind the provider vehicle. Information may be conveyed via, e.g., scrolling text, color, patterns, animation, and any other visual display. As further shown in FIG. 6C, the data collection device 660 may include a power button 612 or any other suitable user interface that can be used to turn the device 660 on or off. In particular embodiments, power button 612 may be a hardware button or switch that physically controls whether power is provided to the data collection device 660. Alternatively, power button 612 may be a soft button that initiates a startup/shutdown procedure managed by software and/or firmware instructions. Additionally, the data collection device 660 may include one or more light features 614 (such as one or more LEDs or other light sources) configured to illuminate areas adjacent to the device 660 and/or provide status signals.

In particular embodiments, the data collection device 660 include a lighting controller to control the colors and/or other lighting displayed by the front display 604, or/and the rear display 610. The lighting controller may include rules and algorithms for controlling the displays so that the intended information is conveyed. For example, to help a set of matching provider and requestor find each other at a pick-up location, the lighting controller may obtain instructions that the color blue is to be used for identification. In response, the front display 604 may display blue and the lighting controller may cause the light features 614 to display blue so that the ride provider would know what color to look for.

Figure 7:
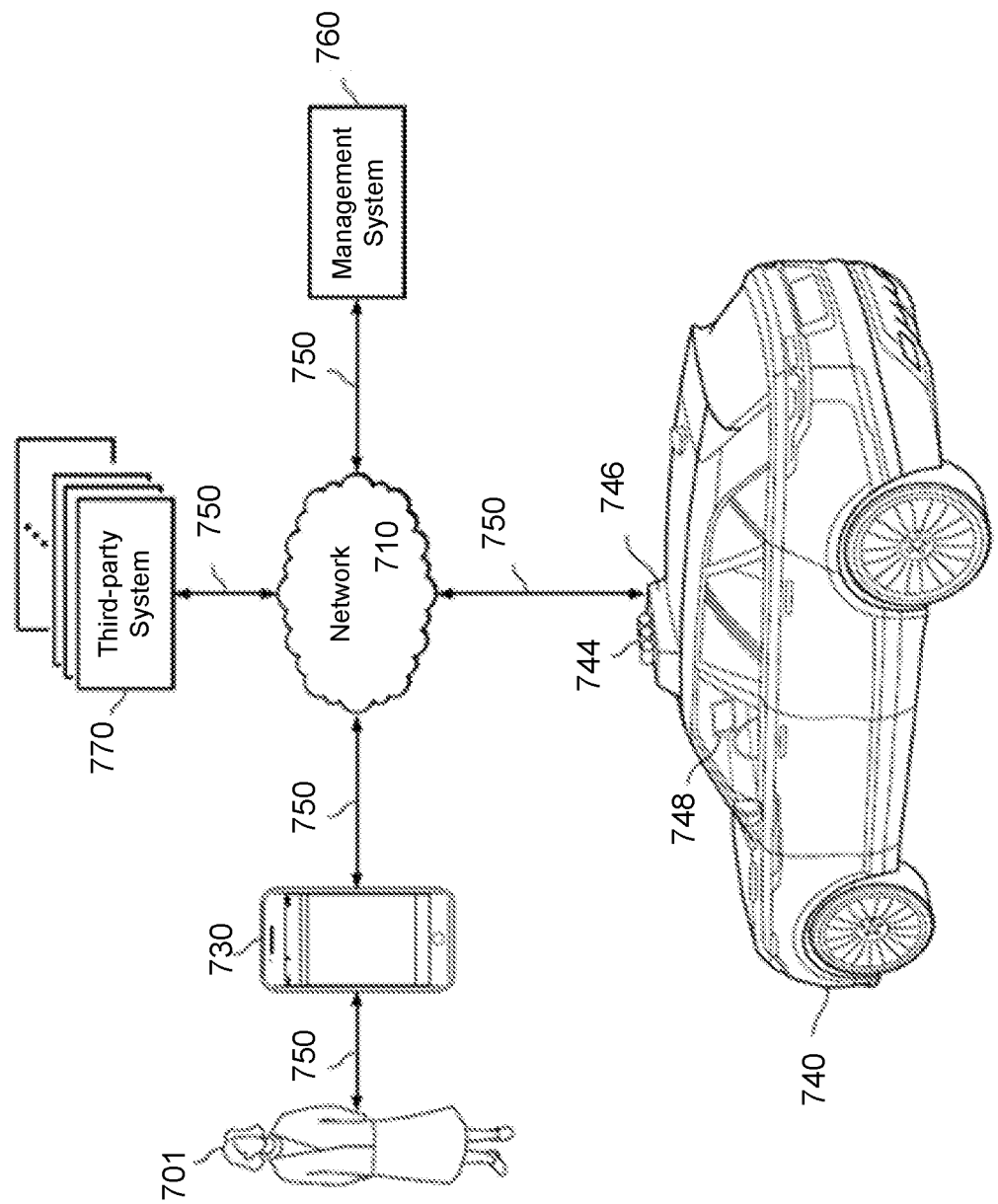
FIG. 7 illustrates an example block diagram of a transportation management environment for matching ride requestors with autonomous vehicles.

FIG. 7 illustrates an example block diagram of a transportation management environment for matching ride requestors with autonomous vehicles. In particular embodiments, the environment may include various computing entities, such as a user computing device 730 of a user 701 (e.g., a ride provider or requestor), a transportation management system 760, an autonomous vehicle 740, and one or more third-party system 770. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example and not by way of limitation, the network environment may include multiple users 701, user devices 730, transportation management systems 760, autonomous-vehicles 740, third-party systems 770, and networks 710.

The user device 730, transportation management system 760, autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP). FIG. 7 illustrates transmission links 750 that connect user device 730, autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, the user device 730 may communicate with the transportation management system via a cellular network and the Internet, but communicate with the autonomous vehicle 740 via Bluetooth or a physical wire connection.

In particular embodiments, the transportation management system 760 may fulfill ride requests for one or more users 701 by dispatching suitable vehicles. The transportation management system 760 may receive any number of ride requests from any number of ride requestors 701. In particular embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In particular embodiments, ride requestor information may include profile information about a particular ride requestor 701. In particular embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example and not by way of limitation, when the transportation management system 760 receives a request to travel from San Francisco International Airport (SFO) to Palo Alto, California, the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 760 in particular embodiments may predict and provide ride suggestions in response to a ride request. In particular embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In particular embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In particular embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In particular embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are required to access the third-party system 770, the user 701 may provide such information to the transportation management system 760, which may serve as a proxy for accessing content from the third-party system 770.

In particular embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 730 may also include one or more cameras, scanners, touchscreens, microphones, speakers, and any other suitable input-output devices.

In particular embodiments, the vehicle 740 may be an autonomous vehicle and equipped with an array of sensors 744, a navigation system 746, and a ride-service computing device 748. In particular embodiments, a fleet of autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, the autonomous vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous vehicle 740 itself, other autonomous vehicles 740, and target destinations such as service centers), navigation information, traffic information, weather information, entertainment content (e.g., music, video, and news) ride requestor information, ride information, and any other suitable information. Examples of data transmitted from the autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In particular embodiments, autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In particular embodiments, an autonomous vehicle 740 may obtain and process sensor/telemetry data. Such data may be captured by any suitable sensors. For example, the vehicle 740 may have a Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on autonomous vehicle 740. Example locations for sensors include the front and rear bumpers, the doors, the front windshield, on the side panel, or any other suitable location.

In particular embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

In particular embodiments, the autonomous vehicle 740 may have a navigation system 746 responsible for safely navigating the autonomous vehicle 740. In particular embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 746 may use its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In particular embodiments, the autonomous vehicle 740 may be equipped with a ride-service computing device 748, which may be a tablet or any other suitable device installed by transportation management system 760 to allow the user to interact with the autonomous vehicle 740, transportation management system 760, other users 701, or third-party systems 770. In particular embodiments, installation of ride-service computing device 748 may be accomplished by placing the ride-service computing device 748 inside autonomous vehicle 740, and configuring it to communicate with the vehicle 740 via a wire or wireless connection (e.g., via Bluetooth). Although FIG. 7 illustrates a single ride-service computing device 748 at a particular location in autonomous vehicle 740, autonomous vehicle 740 may include several ride-service computing devices 748 in several different locations within the vehicle. As an example and not by way of limitation, autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 748 may be detachable from any component of autonomous vehicle 740. This may allow users to handle ride-service computing device 748 in a manner consistent with other tablet computing devices. As an example and not by way of limitation, a user may move ride-service computing device 748 to any location in the cabin or passenger compartment of autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
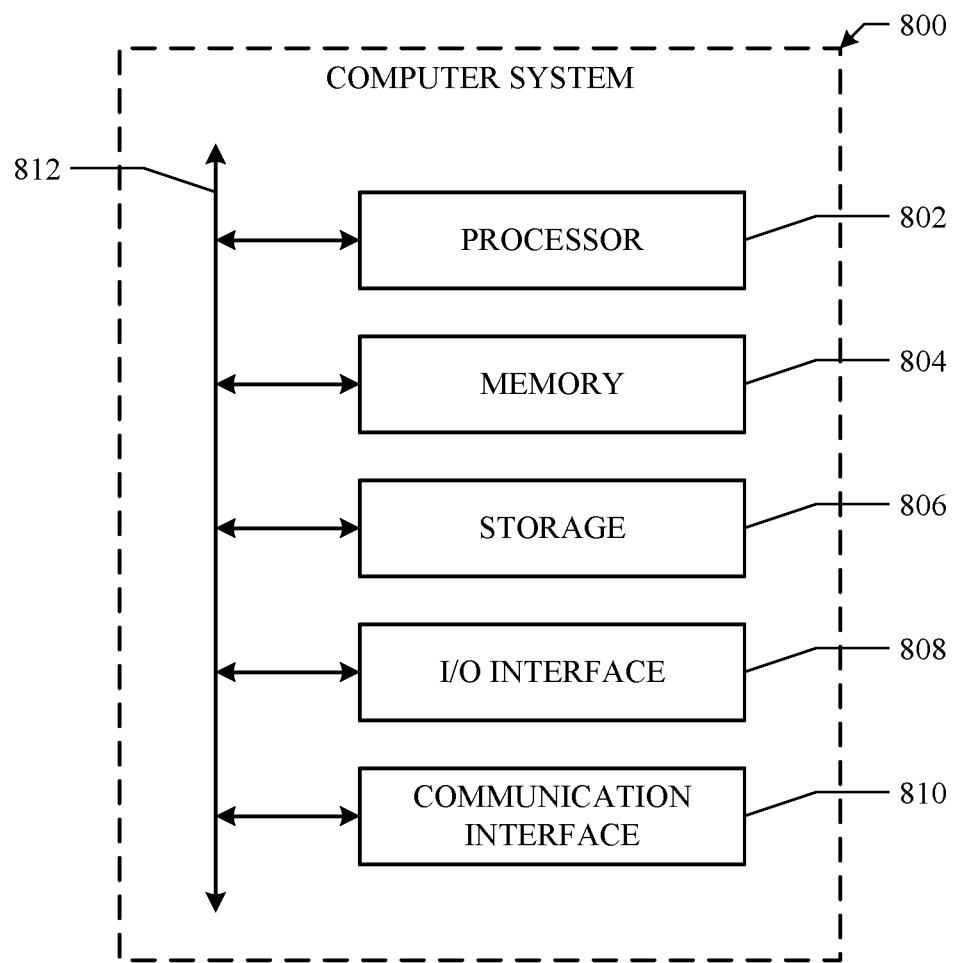
FIG. 8 illustrates an example computing system.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    accessing high-resolution contextual data associated with a vehicle operated by a driver, wherein the high-resolution contextual data is captured using one or more sensors associated with the vehicle and is stored in a volatile memory;
    generating low-resolution contextual data based on the high-resolution contextual data;

storing the low-resolution contextual data into a non-volatile memory;

determining one or more predicted vehicle operations by processing the high-resolution contextual data based at least on information associated with pre-recorded contextual data associated with a plurality of vehicles;

detecting one or more vehicle operations made by the driver;

identifying an event of interest associated with a time window based on a comparison of the one or more vehicle operations made by the driver and the one or more predicted vehicle operations, the event of interest being associated with the high-resolution contextual data; and causing the high-resolution contextual data collected during the time window to be stored in the non-volatile memory by moving the high-resolution contextual data from the volatile memory to the non-volatile memory in response to identifying the event of interest, wherein subsequent high-resolution contextual data beyond the time window is discarded.

2. The method of claim 1, wherein the event of interest is identified based on a determination that the one or more vehicle operations of the driver deviate from the one or more predicted vehicle operations by a pre-determined threshold.

3. The method of claim 2, wherein the event of interest is identified based on a determination that a vehicle position deviates from a predicted vehicle position by a distance greater than a pre-determined threshold distance.

4. The method of claim 1, further comprising:
classifying, using an event classifier, the event of interest into a category based on previously identified events of interest; and
assigning an interest score to the event of interest, wherein the interest score is based at least on the category of the event of interest.

5. The method of claim 4, wherein the event of interest is a new type of event f interest different from the previously identified events of interest.

6. The method of claim 4, wherein the event of interest includes an unrecognizable object that an agent modeler fails to recognize.

7. The method of claim 1, wherein causing the high-resolution contextual data associated with the event of interest to be stored in the non-volatile memory comprises uploading the high-resolution contextual data to a cloud.

8. The method of claim 1, further comprising flagging the high-resolution contextual data to be associated with the event of interest.

9. The method of claim 1, wherein the high-resolution contextual data, compared to the low-resolution contextual data that is stored when corresponding contextual data is determined to be unassociated with the event of interest, comprises more information regarding the event of interest.

10. The method of claim 1, further comprising:
determining an area where the driver is paying attention; and
selecting a contextual data set associated with the area where the driver is paying attention, wherein the high-resolution contextual data comprises the selected contextual data set.

11. The method of claim 1, wherein the high-resolution contextual data of the vehicle comprises one or more parameters associated with the vehicle, and wherein the one or more parameters associated with the vehicle comprise:
a speed;
a moving direction;
a trajectory;
a GPS coordination;
an acceleration;
a pressure on a braking pedal;
a pressure on an acceleration pedal;
a steering force on a steering wheel;
a wheel direction;
a signal state;
a navigation map;
a target place;
a route;
an estimated time; or
a detour.

12. The method of claim 1, wherein the high-resolution contextual data of the vehicle comprises one or more metrics associated with an environment of the vehicle, and wherein the one or more metrics associated with the environment of the vehicle comprise:
a distance to another vehicle;
a relative speed to another vehicle;
a distance to a pedestrian;
a relative speed to a pedestrian;
a traffic signal status;
a distance to a traffic signal;
a distance to an intersection;
a road sign;
a distance to a road sign;
a distance to curb;
a relative position to a road line;
an object in a field of view of the driver;
a traffic status;
a trajectory of another vehicle;
a motion of another traffic agent;
a speed of another traffic agent;
a moving direction of another traffic agent;
a signal status of another vehicle;
a position of another traffic agent; or
aggressiveness metrics of other vehicles.

13. The method of claim 12, wherein the one or more metrics associated with the environment of the vehicle are determined based on one more cameras or LiDAR systems.

14. The method of claim 1, wherein the high-resolution contextual data of the vehicle comprises one or more parameters associated with the driver, and wherein the one or more parameters associated with the driver comprise:
a head position of the driver;
a head movement of the driver;
a hand position of the driver;
a hand movement of the driver;
a foot position of the driver;
a foot movement of the driver;
a gazing direction of the driver;
a gazing point of the driver;
an image of the driver;
a gesture of the driver; or
a voice of the driver.

15. The method of claim 1, further comprising:
generating, by a machine-learning model, one or more multi-channel images based on the high-resolution contextual data of the vehicle, wherein each multi-channel image has multiple channels corresponding to different information layers of the high-resolution contextual data of the vehicle; and
predicting a discretized view of an environment of the vehicle based on the one or more multi-channel images, wherein the one or more predicted vehicle operations are based at least in part on the predicted discretized view of the environment of the vehicle.

16. The method of claim 1, further comprising:
predicting a discretized view of an environment of the vehicle based on a combination of features related to the vehicle, wherein the one or more predicted vehicle operations are based at least in part on the predicted discretized view of the environment of the vehicle, and wherein the combination of features related to the vehicle comprises one or more of:
a current position of the vehicle;
a past position of the vehicle;
a predicted position of the vehicle;
a current velocity of the vehicle;
a past velocity of the vehicle;
a predicted velocity of the vehicle;
velocities and orientations of other traffic agents relative to the vehicle;
velocities and orientations of other traffic agents relative to each other; or
velocities and orientations of other traffic agents relative to one or more map elements.

17. The method of claim 1, further comprising:
training a prediction model using the stored high-resolution contextual data of the vehicle associated with the event of interest, wherein the prediction model improves over time through training.

18. One or more non-transitory computer-readable storage media embodying software that is operable when executed by a computing system to:
access high-resolution contextual data associated with a vehicle operated by a driver, wherein the high-resolution contextual data is captured using one or more sensors associated with the vehicle and is stored in a volatile memory;
generate low-resolution contextual data based on the high-resolution contextual data;
store the low-resolution contextual data into a non-volatile memory;
determine one or more predicted vehicle operations by processing the high-resolution contextual data based at least on information associated with pre-recorded contextual data associated with a plurality of vehicles;
detect one or more vehicle operations made by the driver;
identify an event of interest associated with a time window based on a comparison of the one or more vehicle operations made by the driver and the one or more predicted vehicle operations, the event of interest being associated with the high-resolution contextual data; and
cause the high-resolution contextual data collected during the time window to be stored in the non-volatile memory by moving the high-resolution contextual data from the volatile memory to the non-volatile memory in response to identifying the event of interest, wherein subsequent high-resolution contextual data beyond the time window is discarded.

19. A system comprising:
one or more non-transitory computer-readable storage media embodying instructions; and
one or more processors coupled to the storage media and operable to execute the instructions to:
access high-resolution contextual data associated with a vehicle operated by a driver, wherein the high-resolution contextual data is captured using one or more sensors associated with the vehicle and is stored in a volatile memory;
generate low-resolution contextual data based on the high-resolution contextual data;
store the low-resolution contextual data into a non-volatile memory;
determine one or more predicted vehicle operations by processing the high-resolution contextual data based at least on information associated with pre-recorded contextual data associated with a plurality of vehicles;
detect one or more vehicle operations made by the driver;
identify an event of interest associated with a time window based on a comparison of the one or more vehicle operations made by the driver and the one or more predicted vehicle operations, the event of interest being associated with the high-resolution contextual data; and
cause the high-resolution contextual data collected during the time window to be stored in the non-volatile memory by moving the high-resolution contextual data from the volatile memory to the non-volatile memory in response to identifying the event of interest, wherein subsequent high-resolution contextual data beyond the time window is discarded.

20. The method of claim 1, further comprising:
determining a predicted top view image of an environment of the vehicle; and
determining an actual top view image of the environment of the vehicle, wherein the event of interest is identified based on a determination that the actual top view image of the environment of the vehicle deviates from the predicted top view image of the environment of the vehicle with a difference greater than a threshold.

* * * * *